(12) United States Patent
Pirilä

(10) Patent No.: US 6,377,791 B2
(45) Date of Patent: *Apr. 23, 2002

(54) METHOD AND SYSTEM FOR IDENTIFYING AN ILLEGAL TERMINAL IN A CELLULAR RADIO SYSTEM

(75) Inventor: Hannu Pirilä, Littoinen (FI)

(73) Assignee: Nokia Mobile Phones Ltd., Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,460

(22) Filed: Oct. 6, 1998

(30) Foreign Application Priority Data

Oct. 8, 1997 (FI) .................................................. 973909

(51) Int. Cl.[7] .................................................. H04M 1/66
(52) U.S. Cl. ........................ 455/410; 455/411; 455/456; 455/435
(58) Field of Search .................................. 455/410, 411, 455/38.1, 432, 435, 456, 525, 517, 403, 412, 414, 422, 515, 575

(56) References Cited

U.S. PATENT DOCUMENTS

| | | | |
|---|---|---|---|
| 4,868,846 A | 9/1989 | Kemppi | 379/144 |
| 5,266,782 A | 11/1993 | Alanara et al. | 235/380 |
| 5,822,691 A | 10/1998 | Hosseini | 455/410 |
| 5,845,211 A | * 12/1998 | Roach, Jr. | 455/436 |
| 5,970,404 A | * 10/1999 | Foti | 455/410 |
| 6,067,444 A | * 5/2000 | Cannon | 455/38.1 |
| 6,119,000 A | * 9/2000 | Stephenson | 455/432 |

FOREIGN PATENT DOCUMENTS

| | | |
|---|---|---|
| EP | 0 544 449 A1 | 6/1993 |
| EP | 0 757 502 A2 | 2/1997 |
| WO | WO 96/15643 | 5/1996 |
| WO | WO 97/36438 | 10/1997 |
| WO | WO 98/33340 | 7/1998 |

OTHER PUBLICATIONS

"Digital cellular telecommunications system"; International Mobile station Equipment Identities (IMEI) (GSM 02.16).
"Digital cellular telecommunications system" (Phase 2+); Numbering, addressing and identification (GSM 03.03 version 5.1.0).
"Digital cellular telecommunications system"; Location registration procedures (GSM 03.12).
"Digital cellular telecommunications system" (Phase 2+); Radio subsystem link control (GSM 05.08 version 5.8.0 Release 1996).
"Digital cellular telecommunications system" (Phase 2+); Mobile radio interface layer 3 specification (GSM 04.08 version 5.4.1).
"Digital Cellular Telecommunications System (Phase 2+); Functions Related To Mobile Station (MS) In Idle Mode And Group Receive Mode" (GSM 03.22 version 5.2.1), ETS 300 930.
Finnish Official Action.

* cited by examiner

Primary Examiner—Nguyen T. Vo
Assistant Examiner—John J. Lee
(74) Attorney, Agent, or Firm—Perman & Green, LLP

(57) ABSTRACT

A cellular radio system comprises terminals (401, 402) arranged to transmit a specific message of a predetermined form at least two times (408, 409; 413, 414), so that there is a predetermined time-out between the two successive messages of said form. A message of said form, which is received from a terminal, is attached (503, 507, 509) to a code representing the terminal in order to identify an illegal terminal. Such a terminal is regarded as identified (513, 514) for which the time between the reception of the two successive messages of said form attached to the code representing the terminal is shorter than said time-out.

10 Claims, 5 Drawing Sheets

METHOD AND SYSTEM FOR IDENTIFYING AN ILLEGAL TERMINAL IN A CELLULAR RADIO SYSTEM

TECHNOLOGICAL FIELD

The object of the invention relates to how a cellular radio system is able to identify a terminal using a false identity.

BACKGROUND OF THE INVENTION

In cellular radio systems there are known different identifiers with which the system is able to identify a specific user or a specific terminal. This patent application treats as examples particularly the IMEI code (International Mobile Equipment Identifier) used to identify the equipment part of the terminal, the IMSI code (International Mobile Subscriber Identifier) and the GSM cellular radio system (Global System for Mobile telecommunications). A terminal in the GSM system is for short called MS (Mobile Station) and it comprises a SIM card (Subscriber Identity Module) intended to identify the user and the actual equipment, which is abbreviated ME (Mobile Equipment). Each ME has its own IMEI code which is permanently stored in the equipment and which is intended to act as an unambiguous identifier of the equipment. The length of the IMEI code is 15 characters, and it comprises a Type Approval Code (TAC) of six characters, a Final Assembly Code (FAC) of two characters, the equipment serial number of six characters, and one spare character.

The GSM system specifications GSM 02.16 and GSM 03.03 define how the IMEI code is used to identify the equipment part of the terminals. The purpose is that both single cellular systems and certain registers common to different systems contain knowledge of which IMEI codes correspond to legally used equipment and which equipment must be denied service, either due to a illegal origin of the equipment or due to a fault typical to a specific equipment type. The register containing operational information about the equipment is generally called EIR (Equipment Identity Register) and such registers can be located in a mutual hierarchy, so that an EIR register of a single cellular radio system is located on the lowest hierarchy level, and on a higher level there is an EIR register which the systems use in common. The co-operation body. GSM MoU (GSM Memorandum of Understanding) founded by GSM operators has developed a central register known as CEIR (Central EIR). In order to group equipment into legal and illegal equipment a register of the EIR type contains three lists, which are the white list, the black list and the grey list. The white list contains information about which IMEI codes correspond to equipment used legally, and the black list tells which IMEI codes correspond to "forbidden" equipment. The grey list can be used as a transitional stage between the white list and the black list, if for instance a specific equipment type causes some interference in the network operation, but not so much that equipment of this type should be put directly on the black list.

However, the cloning of IMEI codes has become a problem. Even if the aim has been to make IMEI code falsification difficult, it has turned out that dishonest quarters can copy an IMEI code from one device to another. In a typical case the IMEI code of a legal device is copied or "cloned" into a device which is stolen or can otherwise be considered illegal, whereby the illegal device can be used so that its use can not be prevented by the system. A GSM mobile phone can also call certain emergency numbers without a SIM card, whereby a dishonest user by changing the IMEI code can ensure that it is not possible to prevent or trace malicious emergency calls which he makes.

The cellular radio system can check the IMEI code of terminals in radio connection with the base stations according to a certain routine defined in the system specifications. In the GSM system there is defined a so called RIL3-MM IDENTITY REQUEST message (RIL3=Radio Interface Layer 3; MM=Mobility Management), and by sending this message the system can request the terminal to present its IMEI code or another corresponding identifier. The terminal responds by sending a so called RIL3-MM IDENTITY RESPONSE message, which contains the identifier requested by the system. In principle the system can transmit said message regularly, always at the beginning of an active operating period or RR session, but in practice this is made less frequently in order to reduce signalling requirements. The IMEI code is generally not used to establish calls or to monitor user movements, because regarding the network operation and call charging it is more important to identify the user (or the subscription used by the user). For user identification it is possible to use the IMSI code given to the user, but in order to protect the user's privacy it is preferred to use the TMSI code (Temporary Mobile Subscriber Identifier), which is provided by a specific register in that part of the cellular radio system where the user is operating.

A disadvantage of prior art methods is that they assume that at least one operator knows the IMEI code of an illegal user operating within the system. Due to the cloning method an illegal device can during operation use the IMEI code of a legal device. According to prior art it is impossible to identify the illegal terminals on the basis of the IMEI codes if the operator responsible for the system operation does not know which IMEI codes have been cloned from legal devices into illegal devices.

SUMMARY OF THE INVENTION

The object of the present invention is to present a method which is able to identify devices using a cloned IMEI code or a corresponding identifier. An object of the invention is also to present a cellular radio system realising the method according to the invention.

The objects of the invention are attained by monitoring at how long intervals a terminal reports its IMEI code or corresponding identifier to a central of the cellular radio system. An exceptionally short report interval will reveal a cloned code.

The method according to the invention is characterised in that in this method a regularly transmitted message received from the terminal is attached to the code describing the terminal, and that the terminal is considered to be identified when the period between two successive messages of said kind attached to the describing code is shorter than a predetermined time-out.

An object of the invention is also a cellular radio system and a mobile telephone exchange which are characterised in that they are arranged to attach a regularly transmitted message, which is received from a terminal, to a code representing the terminal, and that they indicate such a terminal as an identified terminal, for which the period between two successive messages of said kind attached to the describing code is shorter than a predetermined time-out.

In cellular systems there is known a method where the terminals regularly report to the system their location in a certain location area. According to the invention the system is able to monitor how long time has passed since a specific terminal last time reported its location. If the location reports should arrive at regular intervals, and if a location report relating to an IMEI code or any other unambiguous identifier arrives earlier that expected, then said identifier is used by at least two devices. In systems where the desired identification report is not automatically related to regular location reports, it is possible to add a feature according to which the system requests the terminal to present said identifier at least in connection with certain location reports.

The system can respond in many different ways when it has identified a specific terminal on the basis of a suspicious IMEI code or a corresponding identifier used by this terminal. One possibility is to immediately bar said terminal from the service provided by the system, whereby a fraudulent user can get only a minimal profit with the illegal device. If the illegal terminal is able to receive text messages (SMS, Short Message Services), it is possible to send it a message, which tells the user why this device can not anymore be connected to the system. Another alternative is to transmit information about a detected suspicious identifier to the terminal, and in this connection to request the device to be brought to an authorised service shop for control. This message can include a time limit before which the control should be made so that the device would not be barred from services provided by the system. A person skilled in the art can easily present more alternative actions. The invention does not limit the manner in which the system should respond to the detection of a suspicious identifier.

BRIEF DESCRIPTION OF THE DRAWINGS

Below the invention is described in more detail with reference to preferred embodiments presented as examples and to the enclosed figures, in which.

DETAILED DESCRIPTION OF THE INVENTION

Figure 1:
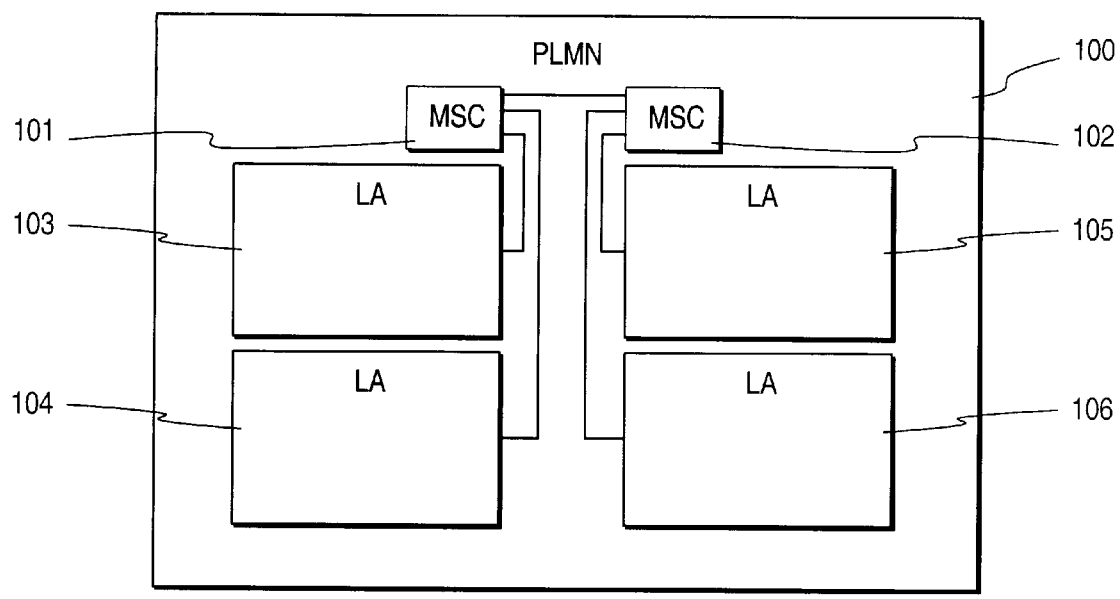
FIG. 1 shows the regional division of a known cellular radio system.

In order to facilitate the understanding of the invention we first describe the location update method known per se used in the GSM system, whereby the messages between a base station and the terminals related to the method are described in more detail in the specification GSM 04.08. FIG. 1 shows schematically the whole coverage area 100 of a specific public cellular radio system (PLMN, Public Land Mobile Network), which usually contains several Mobile services Switching Centres (MSC) 101, 102 communicating with each other and Location Areas (LA) 103, 104, 105 and 106 arranged to belong to each MSC. Each location area comprises one or more cells, where a cell means that geographical area in which a terminal can be in radio communication with a certain base station. For the sake of simplicity the cells and the base stations are not shown in FIG. 1.

A cellular radio system must know the location of a terminal at least in terms of location areas, so that it can direct the transmission of a paging message, corresponding to an incoming call, so that the terminal can receive it. In connection with each mobile telephone exchange 101, or available to the exchange, there are two databases, the Home Location Register (HLR) 201 and the Visitors Location Register (VLR) 202. Of these the HLR contains information about the subscriptions and information about in which region of the mobile telephone exchange each user stored in the HLR currently is operating or was last operating. In the HLR the users are identified by a subscriber identifier or IMSI, which on the terminal side is physically stored in the SIM card used by the user, and which thus is not related to the equipment part used by the user. With the aid of the VLR each mobile telephone exchange keeps a log on the location area of each user operating under the control of said mobile telephone exchange. In the location areas belonging to a VLR the user is identified by the TMSI or a temporary identifier, which comprises a Location Area Identifier (LAI) and a TIC code (TMSI code), which is unambiguous within the location area. The TMSI given as a temporary identifier to a certain user is changed always when the user changes location area.

Figure 2:
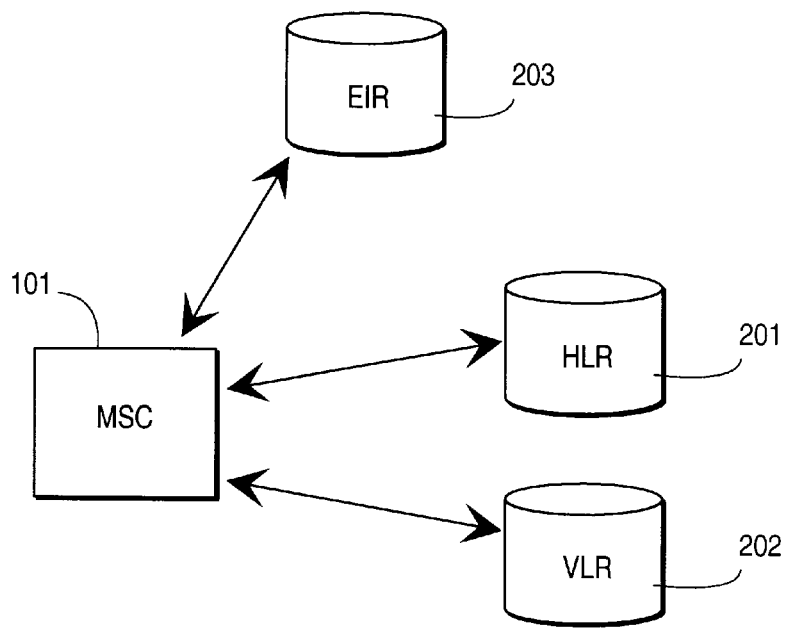
FIG. 2 shows the known databases of a cellular radio system.

A message transmitted by the terminal, which means that the user begins to operate in a certain location area, is called registration. A message, which is transmitted by a registered terminal and which indicates in which location area this terminal is located, is called Location Update. The registration and the location update utilise a similar message exchange between the terminal and the base station. A location update occurs also if the system announces that, due any reason, a certain terminal is not known within that VLR under which it currently operates. FIG. 2 shows also the EIR 203, which the cellular radio system contains, and which, however, is not related to the mobility control of the terminal, but which relates to the monitoring of the equipment utilisation made on the basis on the IMEI codes as described above.

Due to an equipment failure or a corresponding emergency situation the information in the HLR or VLR can be destroyed completely or partially. On the other hand, the user can switch off his terminal or move outside the system's coverage area, whereby old location data will be useless and only occupy space in the database. For these cases it is advisable to check from time to time whether the location data stored in the databases are correct. In the GSM system the check is performed in the form of a periodic location update in a manner defined in the system's technical specifications GSM 03.12, GSM 03.22, GSM 04.08 and GSM 05.08. A terminal which is switched on will periodically transmit a message, in which it reports its location and which causes a location update at least in the VLR (in the HLR only if the terminal has moved into an area of a new mobile telephone exchange). The time-out for a periodic location update, or the period between two messages relating to the location update, is selectable by the operator within the limits of the specifications (minimum 6 minutes, maximum 24 hours). In addition to the periodic location update the location data in the VLR (and also in the HLR) is updated in connection with a location report relating to a cell change causing a change of the location area ("cell reselection"), as well as always when the terminal transmits a so called IMSI ATTACH message. The last mentioned message is transmitted for instance when the terminal registers into a certain cell when the terminal has been switched on.

In order to schedule the periodic location update each GSM terminal, according to the specification GSM 04.08, paragraph 4.4.2, contains a timer called T3212, having a maximum value or a timing cycle (the period from reset to reaching the time-out value set in the timer), the length of which is determined by a message from the cellular system; the system instructs the scheduled period which must be used in the periodic location update. The terminal initiates the periodic location update if and when the timer reaches its maximum value, i.e. when it reports to the terminal's control unit that the time has expired. The timer activity is initiated always when the terminal is set in the so called idle state, whereby its location can be updated ("idle, updated") or not updated ("idle, not updated"). The timer is reset if any of the following conditions are met:

a) the terminal initiates any generically defined location update procedure or transmits an IMSI ATTACH message;
b) the terminal receives a first MM message relating to a specific MM procedure (Mobility Management), or the ciphering mode setting is completed during MM connection establishment;
c) the terminal has responded to a paging message and thereafter correctly received a message belonging to the protocol level 3, the message not being a RR message (Radio Resource management);
d) the timer reaches its maximum value; or
e) the terminal is switched off, or its SIM card is removed.

The MM procedures mentioned in b) above are defined in specification GSM 04.08 paragraphs 4.3 (general MM procedures), 4.4 (specific MM procedures) and 4.5 (establishing and releasing an MM connection).

The invention relates to a perception, according to which also the cellular radio systems knows when each terminal has initiated its timer relating to the periodic location update or when it has reset its timer. The idle state is always entered when an active transmission is terminated, or when the terminal is switched on and it has exchanged with a base station those messages which are required for registration. The cellular radio system functions connected with the alternatives which represent timer reset and which were presented above are the following:

a) the base station receives from the terminal a message which represents the initiating of any generically defined location update function, or an IMSI ATTACH message;
b) the base station transmits to the terminal a first MM message relating to a specific MM procedure, or the ciphering mode setting is completed during establishment of the MM connection;
c) the base station has received from the terminal a response to a paging message and thereafter transmitted a message belonging to the protocol level 3, the message not being a RR message;
d) the base station receives a periodic location update transmitted by the terminal, whereby the update is triggered by the timer reaching its maximum value in the terminal (corresponds to a) above);
e) the connection to the terminal is lost.

Thus the system knows at which moment the timer relating to the periodic location update of each terminal was last reset and at which moment it should reach its maximum value. The latter information is based on the fact that the system itself has instructed all terminals to use a certain timer maximum value. When a message concerning the periodic location update is received from a terminal the system can compare the moment of its arrival with the information about when the message from said terminal should have had arrived. If the message concerning the periodic location update arrives substantially earlier than it should, it is transmitted by another terminal using the same identifier code as the terminal which transmitted the previous message concerning the periodic location update. The location update in itself will not always directly refer to the terminal's IMEI code, but below is description about how an IMEI code check can be combined with location updates.

Figure 3:
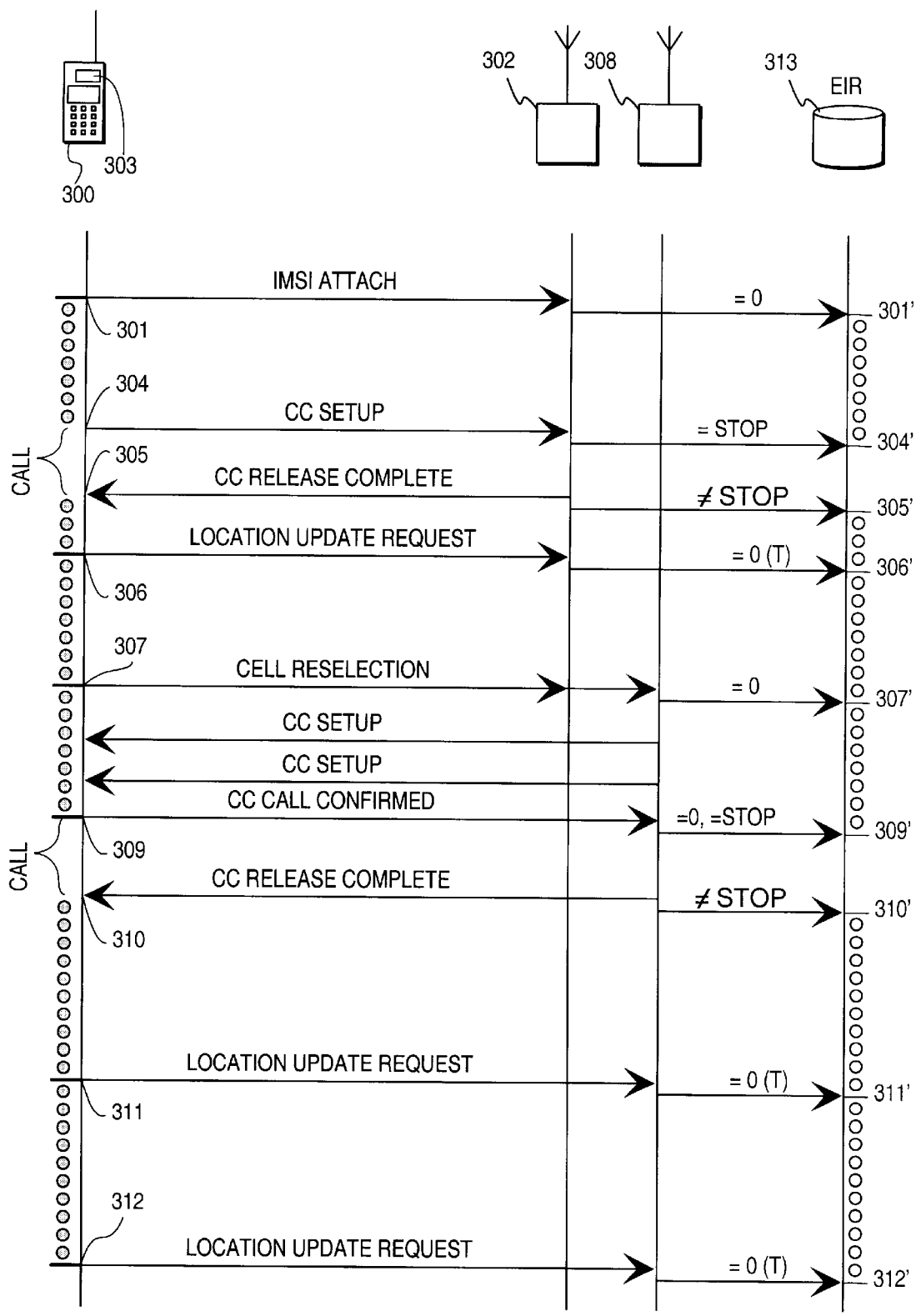
FIG. 3 shows a message exchange related to the invention.

FIG. 3 shows the timing of functions in a terminal 300 (here a GSM mobile phone) concerning the periodic location update. In the figure the time proceeds from top to bottom, and the horizontal arrows represent radio messages between the terminal and the base stations as well as messages between the base stations and a certain register containing equipment data. Regarding the most messages shown in the figure the base station is only a message intermediary between the radio interface and the other stationary parts of the system, and it does not actively participate in the message processing, so the figure has to be construed so that the base stations generally represent the stationary parts of a cellular radio system. The register called EIR in the figure could also be any other information processing and storing device.

In step 301 the mobile phone is switched on, whereby it registers in the location area represented by the base station 302 and enters then the idle state. Because the registration is accompanied by an IMSI ATTACH message causing the location update, the timer 303 in the mobile phone is reset and it starts to count the time to the transmit moment of the next message representing the periodic location update. In the left part of the figure the circles represent periods when the timer 303 is active, and the black lines perpendicular to the line of circles represent moments when the timer 303 is reset. The figure is based on the assumption that the maximum value of the timer 303 corresponds to ten circles. In state 304 the user makes a call which causes a transition from the idle state into the active state, whereby the activity of the timer 303 is temporarily interrupted, but it is not reset. The invention is as well applicable to such systems in which a call made by the user causes the timer to be reset. The establishment and release of a call can include a plurality of messages, but for the sake of clarity the figure presents only the so called CC SETUP message transmitted by the mobile phone in relation to the call establishment and the so called CC RELEASE COMPLETE message originating in the mobile telephone exchange and transmitted via the base station in relation to the release of the call. Other signalling concerning the call is not relevant to the invention, and therefore it is not shown in FIG. 3. In state 305 the call is terminated, the mobile phone 300 enters again the idle state and the activity of the timer 303 is continued from where it was interrupted in state 304.

In state 306 the timer 303 reaches its maximum value, whereby the mobile phone 300 transmits a RIL3-MM LOCATION UPDATE REQUEST message concerning the periodic location update and the timer 303 is reset. Before the timer 303 the next time can reach its maximum value there is in state 307 a cell reselection to the cell of the base station 308. A cell reselection includes a plurality of messages, but for simplicity this is indicated only by one arrow in the figure. The cell reselection includes a location information update, at least when the location area is simultaneously changed, whereby the timer 303 is reset. In state 309 the mobile phone 300 answers a paging message representing an incoming call, and immediately thereafter it receives a first message of level 3, which is not an RR message, so the timer is again reset before it can reach its maximum value. During a call initiated by the answer to a paging message the mobile phone is in the active state, i.e. the timer 303 is stopped. When the call is terminated in state 310 the timer again resumes its activity and in state 311 it reaches its maximum value, whereby the mobile phone 300 again transmits the RIL3-MM LOCATION UPDATE REQUEST message concerning the periodic location update. The same procedure is repeated in state 312 because between the states 311–312 there is no location update nor events requiring the timer 303 to be reset.

According to the invention it can be arranged so that the cellular radio system's EIR register 313 or a corresponding register in the cellular radio system stores information about the reception moment of the RIL3-MM LOCATION UPDATE REQUEST relating to each periodic location update transmitted by the mobile phone 300, and also information about whether other events have occurred since the previous RIL3-MM LOCATION UPDATE REQUEST message which would have caused the timer 303 to be reset. As long as the reception moments of the successive messages relating to the periodic location update differ by that amount of time which is instructed to be used in the system as the maximum value for the timer, which controls the periodic location update, then the timing is normal for the concerned terminal.

The right hand side of FIG. 3 shows messages which the base stations transmit to the EIR 313 or to the corresponding register in order to generate information about when a message relating to the next periodic location update can be expected from the terminal. The messages marked by the identifier "=0" indicate that the terminal 300 has performed an action which caused the timer 303 to be reset. If the identifier is "=0(T)", then the message means that the timer 303 reset was caused as the timer reached its maximum value and triggered the periodic location update. The identifier "=STOP" means that the terminal 300 has made something that caused the timer 303 to be stopped, and the identifier "≠STOP" means that the timer 303 was restarted.

FIG. 3 shows that the periodic location update caused by the timer 303 reaching its maximum value will not occur regularly, because the timer can be stopped for a indeterminate time, or it can be reset before it reaches its maximum value. However, the cellular radio system is able to calculate when the next periodic location update occurs which is caused by the timer reaching its maximum value, because the stopping of the timer and its restart, as well as a timer reset, are related (except for switching off the terminal) to events when the terminal communicates in a certain manner with a base station.

For instance, in state 306' the EIR 313 shown in the figure can check how long time has elapsed since it received the last "=0" message (state 301') relating to the terminal 300, and how large part of the elapsed time belongs to the period between the messages "=STOP" and "≠STOP" (states 304' and 305') representing a stopped timer. In order to facilitate the comparison the figure shows circles also on the side of the vertical line representing the EIR, even though the EIR does not have a separate timer for each terminal, but the EIR only stores the arrival moments of the different messages and uses them to calculate the lengths of the periods. From these data the EIR 313 can calculate whether the timer 303 has triggered the periodic location update at the correct moment. Another possibility is that the EIR 313 processes only such situations where no other messages relating to the terminal 300 have arrived between two successive "=0(T)" messages. In FIG. 3 this means that the EIR 313 performs no checks in states 306' and 311', because in states 304', 305', 307', 309' and 310' it received messages, according to which the terminal's 300 timer 303 was stopped or reset due to other reasons, but in state 312' it checks whether the time elapsed between states 311' and 312' equals the time-out, which in the system was defined as the period between two successive periodic location updates.

The FIG. 3 does not show a situation where the period between two successive messages representing periodic location updates would be longer than the time-out used in the system. However, such a situation could be the result when the terminal occasionally moves into a shadow region and its timer tries to trigger a periodic location update when there is no connection to a base station.

Figure 4:
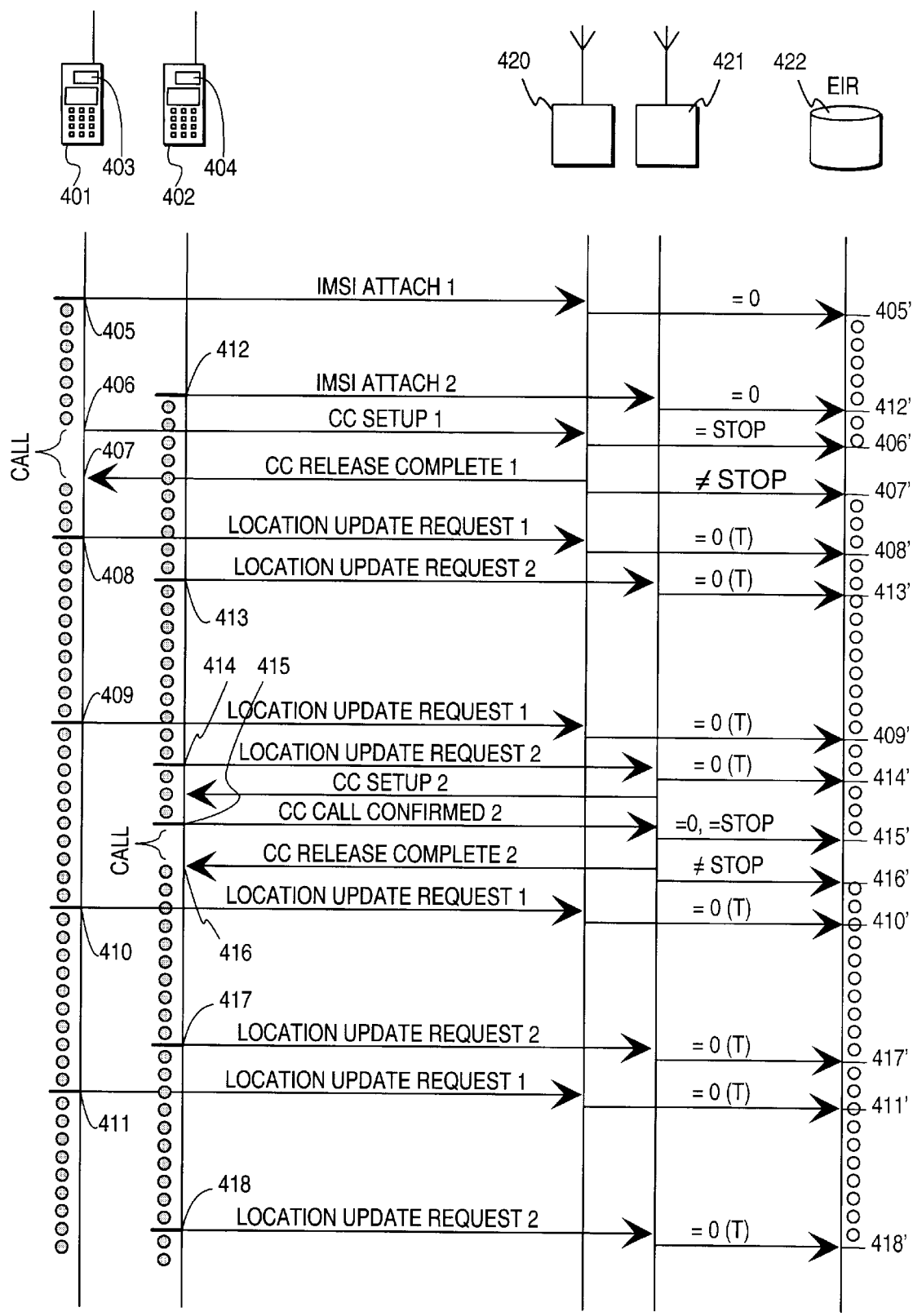
FIG. 4 shows another message exchange related to the invention.

FIG. 4 shows a situation where two terminals 401 and 402 having the same IMEI code operate in the area of the same cellular radio system. The terminals can operate anywhere within the region of the cellular radio system. The periodic location update in the terminal 401 is controlled by the timer 403 and in the terminal 402 by the timer 404. The terminal 401 is switched on in state 405, whereby it registers in the location area represented by the base station 420, and the timer 403 is started. Between the states 406 and 407 the terminal 401 is engaged in a call, during which the timer 403 is stopped. In the states 408, 409, 410 and 411 the timer 403 reaches its maximum value, whereby it is reset and the terminal 401 transmits the RIL3-MM LOCATION UPDATE REQUEST message representing a periodic location update.

The terminal 402 is switched on in state 412, whereby it registers in the location area represented by the base station 421, and the timer 404 is started. In states 413, 414, 417 and 418 the timer 404 reaches its maximum value, whereby it is reset and the terminal 402 transmits the RIL3-MM LOCATION UPDATE REQUEST representing a periodic location update. Between the states 415 and 416 the terminal 402 is engaged in a call, during which the timer 404 is stopped.

Let's first assume that the EIR 422 checks the timing relating to the periodic location update always when it receives a message of the "=0(T)" type, in other words always when the location update relates to the timer reaching its maximum value and triggering the periodic location update. The first state in FIG. 4 where the EIR 422 can check the timing is state 408', where it receives information about the RIL3-MM LOCATION UPDATE REQUEST message transmitted by the terminal 401. The EIR 422 does not yet know that there are two terminals with the same IMEI code operating in the cellular radio system, so it acts as if all messages shown in the figure would relate to the same terminal and thus to the same timer. The previous time it received information about the timer reset in state 412', and it knows that the timer is then stopped during a period corresponding to the interval between the states 406' and 407'. The total time which is obtained by summing the period between the states 412' and 406' and the period between the states 407' and 408' is substantially shorter than the time-out set as the maximum value for the timer. The same observations can be made at all states where the EIR 422 checks the timing (states 413', 409', 414', 410', 417', 411' and 418'). The time from the previous reset, reduced with any periods corresponding to the terminal's timer being stopped, is always shorter than the maximum time set in the timer.

In an alternative embodiment the EIR 422 checks the timing only when it has received two successive messages of the "=0(T)" type between which there is no moment or period when the terminal's timer would have been reset due to another reason or when it would have been stopped. Such check points are the states 413', 414', 417', 411' and 418' in FIG. 4. At all these states we can see that the time which elapsed from the moment when the terminal's timer reached its maximum value to the moment when it triggered the periodic location update is shorter than the maximum time set for the timers of the terminals.

In FIG. 4 it is assumed that the events relating to the terminals 401 and 402 and the starting, stopping an resetting of the timers occur in such a mutual order that, except for a too short timing cycle, they can occur in a single terminal. Thus the mutual order of the messages relating to the events is logical; for instance a message representing stopping of the timer is always followed by a message representing the starting of the timer, and so on.

Particularly in situations where one legal identifier is copied into several illegal terminals it may happen that the activities of the terminals are interleaved in such a way that the messages relating to starting, stopping and resetting the timer will not arrive in a logical order at the EIR. For instance, the EIR may receive several successive messages representing a timer stopping without any messages between them representing a timer starting. In addition to the reaction to a too short timer cycle presented above, or instead of it, the EIR can also react to messages not being in a mutual logical order, and generate an announcement, in which an identifier causing this reaction will be indicated as a suspicious identifier.

Above we have discussed only a timer related to the periodic location update and the messages between the terminal and the system relating to the timer's operation. A cellular radio system does not necessarily require that the messages relating to the location update should refer to a specific IMEI code or more generally to that identifier which presently is the object of interest. For instance, in the GSM system the location update defined in the specifications occurs only on the basis of the TMSI and IMSI codes describing the user (or in fact, the subscription available to the user). The system operation requires some changes in order to be able to utilize the periodic location update in a manner according to the invention in order to detect cloned IMEI codes.

Figure 5:
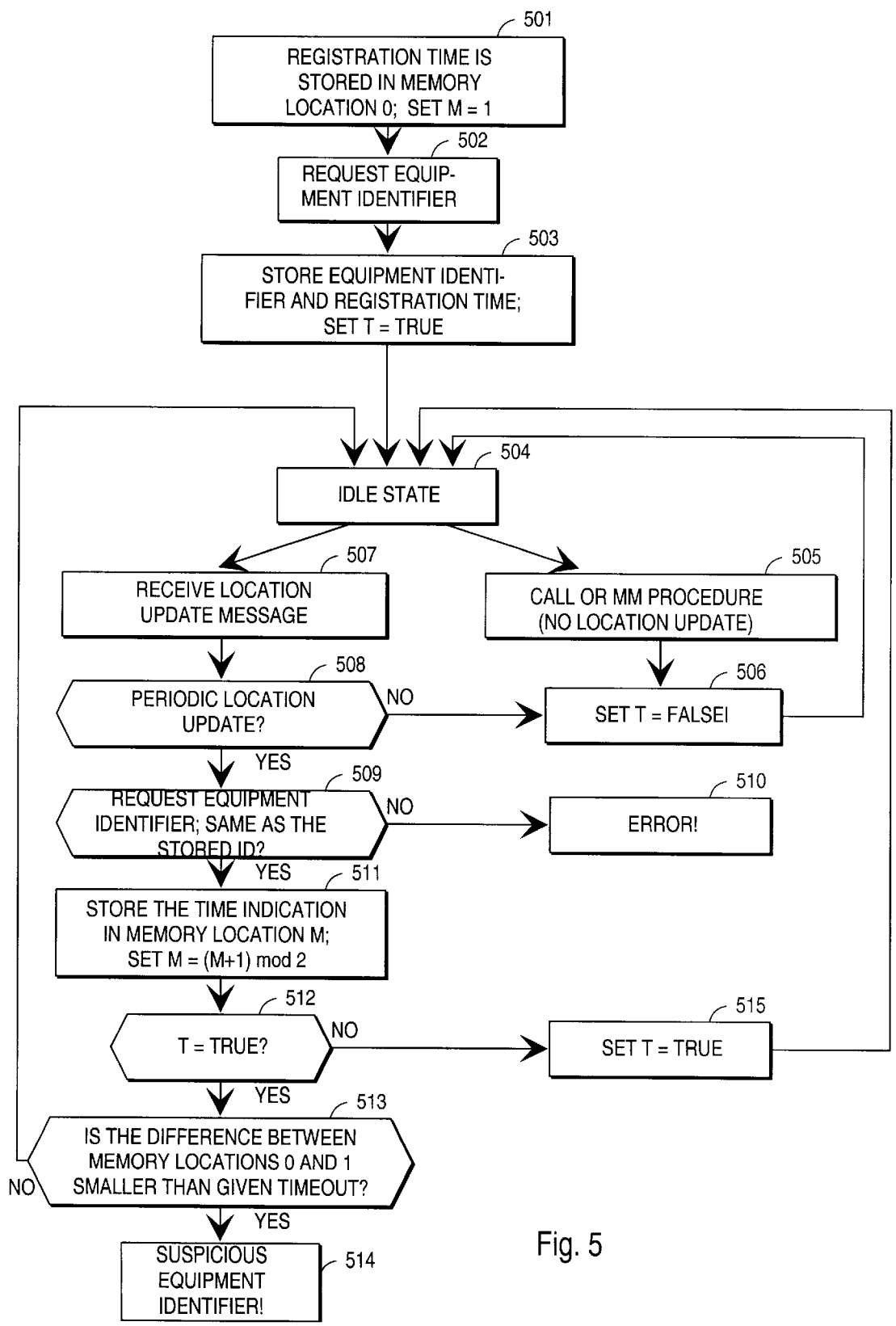
FIG. 5 shows a method according to the invention.

FIG. 5 shows schematically one alternative to arrange in a manner according to the invention the operation of the cellular radio system and the EIR or a corresponding register connected to the system. In the figure it is assumed that the system reserves two memory locations for each monitored terminal, which can store time data, and which are called memory locations 0 and 1. Further it is assumed in the figure that the system will check the timing relating to a periodic location update only when two messages have arrived from the terminal relating to the periodic location update without any events between these messages that would have caused the timer to be stopped or premature reset of the timer.

In state 501 a certain terminal is registered in the system, either because it is switched on or because it moves in from another part of the system or from a completely different system. Above it was noted that the timer controlling the periodic location update in the terminal is reset in connection with the registration, so as a response to the registration the system stores in its memory the registration time. Here the time indication is stored in the memory location 0. The variable M indicating the next memory location is given the value 1, so that next time the data will be stored in the memory location 1.

In state 502 the system requests the terminal to disclose its equipment identifier; in the GSM system this is made by transmitting the RIL3-MM IDENTITY REQUEST message, in which a value representing the IMEI code is put into the Identity Type field representing the requested identifier. When the terminal has disclosed the required equipment identifier the system stores it in state 503, so that it later can check when a terminal using a certain equipment identifier has registered. The variable T is given the value "true", which means that it is possible to carry out a check based on the stored time indications. Then the system proceeds to the idle state 504 regarding the monitoring of the equipment identifier and the location updates.

If the system according to the state 505 detects a call or an MM procedure concerning said terminal which is not a location update, then the system will give the value "false" to the variable T in state 506, because the detected call or MM procedure means that the terminal's timer has been stopped and/or reset. The state 506 is followed by a return to the idle state 504. When the system is in the idle state and detects according to state 507 that the terminal has transmitted a RIL3-MM LOCATION UPDATE REQUEST message, then it first will check, in state 508, whether this is a message representing a periodic location update. In the GSM system this is shown by the Location Updating Type field included in the message; the value "01" formed by the bits 2 and 1 of the field's first octet represents a periodic location update. If the message concerns something else then the value of the variable T is set to "false" in state 506, because the terminal's timer is reset, and then there is a return to state 504. If the message concerns a periodic location update, then the system in state 509 transmits to the terminal a new request to disclose its equipment identifier and checks that the equipment identifier is the same as the system has stored earlier. If the equipment identifier is not the same, then there has occurred an error somewhere. State 510 represents an action known per se in an error situation.

It is most probable that the equipment identifier checked in the state 509 is the same, whereby in state 511 the system stores the time indication corresponding to the periodic location update in that memory location which is indicated by the value of the variable M. The calculation formula also presented in the state 511 means only that if the value of the variable M until now has been 0, then it gets the value 1, and if it until now has been 1, then it gets the value 0. In state 512 the value of the variable T is checked. If its value is "true", then there has been no stop or premature reset of the terminal's timer since the previous storing operation. Then the system in state 513 checks whether the difference between the time indications stored in the memory locations 0 and 1 is possibly smaller than the time-out set for the periodic location update, and if so, then according to state 514 the concerned equipment identifier can be marked as suspicious. If the difference between the time indications was acceptably close to the set time-out, then the process returns to the state 504. A difference between the time indications which is as long as the set time-out can be considered acceptable considering the possibility of such timing errors between different devices, which are defined in the specification regarding acceptable timing errors in the system.

It the value of the variable T in state 512 was found to be "false", then there is no need to perform the check according to state 513, because it is not known how long the terminal's timer has been stopped or when it was prematurely reset. However, because the time indication stored in state 511 corresponds to the periodic location update the value of the variable T is then set to "true" in state 515, and the process returns to the state 504 to wait for the next message from the terminal concerning the periodic location update. The execution of the method according to FIG. 5 can be terminated in any state if the terminal moves outside the region of the system where the method is applied, or if the terminal is switched off: a loss of the communication link causes actions known per se, with which the system controls that its resources are not unnecessarily reserved for terminals which have moved away.

The method presented in FIG. 5 is of course only one example of how the inventive idea can be realised. An easy change of the method presented in FIG. 5 is to replace the check in state 513 with a more general check, where it is studied whether the time difference of the time indications on the whole is different from the given time-out. The method can be programmed as a program run in a computer, whereby it is most preferably run in the same equipment, which according to the prior art specifications generates and transmits the equipment identifier requests to the terminals and processes the equipment identifiers transmitted as responses from the terminals as well as the messages with which a terminal updates its location. In the GSM system this equipment is the mobile telephone exchange, where the VLR operates as the memory location for the location information.

Figure 6:
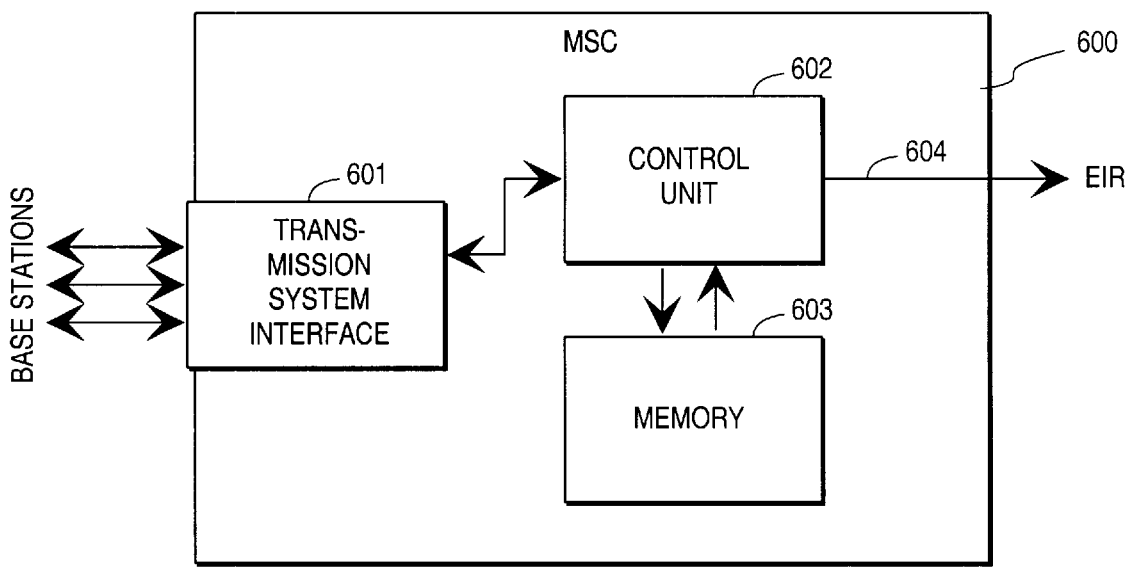
FIG. 6 shows some parts of a mobile telephone exchange according to the invention.

FIG. 6 shows schematically those parts of a mobile telephone exchange which are essential when the invention is applied in a typical digital cellular radio system. The mobile telephone exchange 600 contains a transmission system interface unit 601, which transmits telecommunication between the mobile telephone exchange 600 and the transmission system (the transmission system connects the mobile telephone exchange to the base stations via the base station controllers which control the base stations). Further the mobile telephone exchange 600 comprises a central processing unit 602, which generates the contents of the transmitted messages and which decomposes the received messages. The memory 603 contains the required memory locations, which store the equipment identifiers of registered terminals and the time indications relating to the registrations and periodic location updates. The instructions representing the execution of the method according to the invention are also stored in the memory 603. The central processing unit 602 performs the required calculations and comparisons on the basis of the stored time indications, and when required it supplies messages about an equipment suspicious identifiers via the line 604, either to the EIR or some other device, through which an operator responsible for the system operation monitors the utilization of terminals in the system.

The invention can also be applied so that it detects terminals which operate in different systems and which use the same IMEI code or a corresponding identifier. Then the mobile telephone exchanges according to FIG. 6, or any other system equipment operating in the same manner, transmit as such to a central register the equipment identifiers, which they have stored, and the time indications relating to the messages representing the periodic location updates and which have arrived at correct intervals, whereby the central register accumulates data from several systems. Then the central register has a record for each stored IMEI code, whereby the time indications transmitted by the different systems are stored in these records. The central register can check whether a certain IMEI code has been used in two different systems simultaneously. Already this will indicate a cloned IMEI code. If the systems are located geographically so that they are wholly or partly overlapping, then a legal user could have moved from one system to another. However, if the central register has information also about which time-out each system uses for the periodic location update, then it can calculate on the basis of each record and said time-outs whether the entries have been caused by one or more terminals.

With the invention it is possible to detect cloned IMEI codes or corresponding equipment identifiers by mainly using means already available in known cellular radio systems. No changes have to be made in the known structure or operation of terminals, because they are already arranged to transmit messages related to a periodic location update, controlled by an internal timer, and to respond to a correctly formed request transmitted by the system by reporting their equipment identifier. The reprogramming of the functions of a mobile telephone exchange or corresponding equipment of a cellular radio system is a method known per se, so it can be reprogrammed also to realize the inventive idea presented in this application.

The memory space required by the invention is rather small, because in the most preferred case only the equipment identifier, two time indications, and the value of two variables must be stored for each monitored terminal. Further, the required processing time is minimal. For instance, the immense amount of source material requires substantial computer runs in an alternative method which stores the IMEI and IMSI codes appearing in pairs and which compares all stored pairs with each other in order to find such IMEI codes which are related to the occurrence of several IMSI codes. Further this alternative embodiment generates false indications, because it is quite legal, and indeed quite common, that several users use the same equipment part but each user has his own SIM card. In practice the inventive idea presented in this patent application can be realized by using different embodiments without departing from the scope defined be the claims presented below.

In the preceding text, the IMEI code was preferred as the code that is used to detect fraudulent users. In a variation of the invention the occurrence of IMSI codes in specific messages which the terminals should send with predetermined intervals could be used to detect forged subscriber identities.

What is claimed is:

1. A method for identifying an entity, which is a terminal or a subscriber using a terminal, in a cellular radio system comprising terminals arranged to transmit a message of a predetermined form at least two times, so that there is a predetermined time-out between the two successive messages of said form, wherein said message of a predetermined form is a message representing a periodic location update, the method comprising the steps of;

associating a first message of said predetermined form, which is received from a terminal, with a code representing sold entity, regarding an entity as an identified entity If the time between the reception of the two successive messages of said form attached to the code representing the terminal is shorter than said time-out, wherein the method comprises further steps of:
a) storing a first time indication representing a reset moment of a timer in the terminal which controls the periodic location update;
b) storing a second time indication corresponding to reception of a message representing a periodic location update transmitted by the terminal;
ab) between the steps a) and b), storing a third time indication, which represents the stopping of said timer in the terminal, and storing a fourth time indication, which represents restarting of sold timer in the terminal when the timer has been stopped;
c) calculating a first difference between stored first and second time indications of the steps a) and b);
d) comparing said first difference with said time-out; and
cd) between the steps c) and d), subtracting a second difference between fourth and third time indications of step ab) from sold first time difference.

2. A method according to claim 1, wherein the entity is a terminal, and the code representing said terminal is an IMEI code intended to identify the equipment part of a terminal, or the entity is a subscriber, and the code representing said subscriber is an IMSI code intended to identify the subscriber-specific part of a terminal.

3. A method according to claim 1, wherein the entity is a terminal and the steps b), c) and d) are executed only if, after said first stored time indication, no facts have been observed which would cause a stopping or resetting of said timer by the periodic location update.

4. A method for identifying a terminal in a cellular radio system comprising terminals, where in each terminal contains a timer with a certain time-out which controls the periodic location update of the terminal, the method comprising the steps of;
 a) storing, in association with a code representing a terminal, a first time indication which represents a known reset moment of such a timer in said terminal which controls the periodic location update;
 b) storing, in association with said code, a second time indication which corresponds to the reception of a message representing a periodic location update transmitted by the terminal;
 c) calculating a first time difference between the stored first and second time indications, and adjusting a value of said first difference in accordance with a possible stoppage of said timer;
 d) comparing said first time difference with said time-out; and
 e) regarding the terminal represented by said code as an identified terminal if said first time difference is shorter than said time-out.

5. A method according to claim 4, further comprising;
 between steps a) and b), steps of storing a third time indication, which represents a stopping of said timer in the terminal and storing a fourth time indication, which represents a restarting of said timer in the terminal after the timer has been stopped, and
 between steps c) and d), a step of subtracting a second time difference between said fourth and third time indications from sold first time difference.

6. A method according to claim 4, wherein the steps b), c) and d) are executed only if, after said first stored time indication, no facts have been observed which would cause a stopping of said timer or a resetting of said timer by reasons other than periodic location update.

7. A method for identifying a subscriber of a cellular radio system comprising terminals arranged to transmit a specific message of a predetermined form at least two times, so that there is a predetermined time-out between the two successive messages of said form, the method comprising the steps of:
 associating a first message of predetermined form, which is received from a terminal, with a code representing a subscriber;
 associating a second message of predetermined form which is received from a terminal, with said code;
 examining the time difference between the reception of said first and second messages, and adjusting a value of said time difference in accordance with a possible stoppage of a timer of one of said terminals monitoring time of reception of said first message; and
 regarding such a subscriber as an identified subscriber for which said time difference is shorter than said time-out.

8. A method according to claim 7, wherein the code representing said subscriber is an IMSI code intended to identify the subscriber-specific part of a terminal.

9. A cellular radio system which comprises terminals arranged to transmit a message of a predetermined form at least two times so that there is a predetermined time-out between the two successive messages of said predetermined form, wherein said message of a predetermined form is a message representing a periodic location update, the cellular radio system comprising:
 means for attaching a message of said predetermined form received from a terminal to a code representing the terminal;
 means for indicating such a terminal as an identified terminal for which the time difference between the reception of the two successive messages of said predetermined form attached to the code representing the terminal is shorter than sold time-out;
 means for storing a first time indication representing a reset moment of a timer in the terminal which controls the periodic location update;
 means for storing a third time indication, which represents a stopping of said timer in the terminal, and a fourth time indication, which represents a restarting of said timer in the terminal when the timer has been stopped;
 means for storing a second time indication corresponding to the reception of a message representing a periodic location update transmitted by the terminal;
 means for calculating a first difference between the stored first and second time indications;
 means for subtracting a second difference between said fourth and third time indications of said first difference; and
 means for comparing said first difference with said time-out.

10. A mobile telephone exchange, which is arranged to receive from the terminals of a cellular radio system via base stations of the cellular radio system a message of a predetermined form at least two times, so that there is a predetermined time-out between two successive messages of sold form, wherein said message of a predetermined form is a message representing a periodic location update, the mobile telephone exchange comprising:
 means for attaching a message of said form to a code representing the terminal;
 means for indicating a terminal as identified for which the time between the reception of two successive messages of said form attached to the code representing the terminal is shorter than said time-out;
 means for storing a first time indication representing the reset moment of a timer in the terminal which controls the periodic location update;
 means for storing a third time indication, which represents the stopping of said timer in the terminal, and a fourth time indication, which represents a restarting of said timer in the terminal when the timer has been stopped;
 means for storing a second time indication corresponding to the reception of a message representing a periodic location update transmitted by the terminal;
 means for calculating a first difference between the stored first and second time indications;
 means for subtracting a second difference between sold fourth and third time indications from said first difference; and
 means for comparing said first difference with said time-out.

* * * * *